US008996926B2

(12) United States Patent
Brewerton et al.

(10) Patent No.: US 8,996,926 B2
(45) Date of Patent: Mar. 31, 2015

(54) DMA INTEGRITY CHECKER

(71) Applicant: Infineon Technologies AG, Neubiberg (DE)

(72) Inventors: Simon Brewerton, Bristol (GB); Simon Cottam, Bristol (GB); Frank Hellwig, Wunstorf (DE)

(73) Assignee: Infineon Technologies AG, Neubiberg (DE)

( * ) Notice: Subject to any disclaimer, the term of this patent is extended or adjusted under 35 U.S.C. 154(b) by 219 days.

(21) Appl. No.: 13/651,775

(22) Filed: Oct. 15, 2012

(65) Prior Publication Data

US 2014/0108869 A1    Apr. 17, 2014

(51) Int. Cl.
*G06F 11/00*    (2006.01)
*G06F 11/10*    (2006.01)

(52) U.S. Cl.
CPC ................................ *G06F 11/1048* (2013.01)
USPC .............................................. 714/52; 710/24

(58) Field of Classification Search
CPC ..... G06F 11/08; G06F 11/10; G06F 11/1004; G06F 13/12; G06F 13/122; G06F 13/124; G06F 13/28
USPC ................. 714/25, 42, 48, 53, 54; 710/22–28
See application file for complete search history.

(56) References Cited

U.S. PATENT DOCUMENTS

| | | | |
|---|---|---|---|
| 6,202,107 B1* | 3/2001 | Collier | 710/22 |
| 6,874,054 B2* | 3/2005 | Clayton et al. | 710/310 |
| 7,003,702 B2* | 2/2006 | Budd et al. | 714/52 |
| 7,222,197 B2* | 5/2007 | Jeddeloh | 710/22 |
| 7,496,695 B2* | 2/2009 | Go et al. | 710/22 |
| 7,620,746 B2* | 11/2009 | Go et al. | 710/22 |
| 2005/0289253 A1* | 12/2005 | Edirisooriya et al. | 710/22 |
| 2008/0147908 A1* | 6/2008 | Lahti et al. | 710/23 |
| 2008/0222317 A1* | 9/2008 | Go et al. | 710/22 |
| 2009/0271536 A1 | 10/2009 | Tiennot | |

* cited by examiner

*Primary Examiner* — Scott Baderman
*Assistant Examiner* — Joseph Kudirka
(74) *Attorney, Agent, or Firm* — Eschweiler & Associates, LLC (57) ABSTRACT

Some embodiments relate to a Direct Memory Access (DMA) controller. The DMA controller includes a set of transaction control registers to receive a sequence of transaction control sets that collectively describe a data transfer to be processed by the DMA controller. A bus controller reads and writes to memory while the DMA controller executes a first transaction control set to accomplish part of the data transfer described in the sequence of transaction control sets. An integrity checker determines an actual error detection code based on data or an address actually processed by the DMA controller during execution of the first transaction control set. The integrity checker also selectively flags an error based on whether the actual error detection code is the same as an expected error detection code contained in a second transaction control set of the sequence of transaction control sets.

24 Claims, 5 Drawing Sheets

DMA INTEGRITY CHECKER

BACKGROUND

Figure 1:
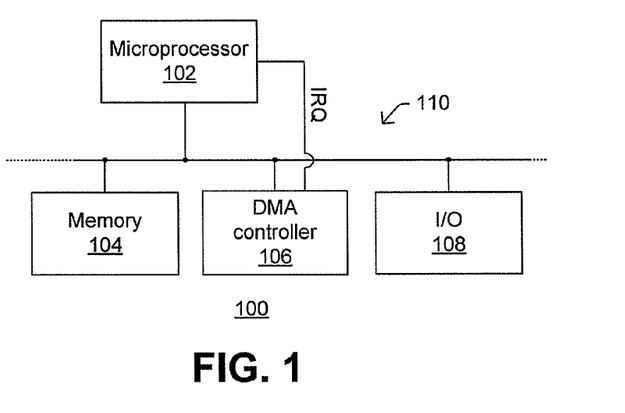
FIG. 1 shows a block diagram of a digital system that makes use of a direct memory access (DMA) controller.

Direct memory access (DMA) controllers allow certain hardware subsystems within a computing system to access system memory somewhat independent of a central, microprocessor unit. To illustrate general DMA functionality, consider the example of FIG. 1, which illustrates a digital system 100 including a microprocessor 102, memory 104, DMA controller 106 and input/output block 108, all of which are operably coupled via a system bus 110. Without the DMA controller 106, when the microprocessor 102 is required to transfer large amounts of data in memory 104 or is required to write data to or read data from I/O block 108 or another system peripheral, the microprocessor 102 is typically fully occupied for the entire duration of read or write operations during the transfer. With the DMA controller 106, however, the microprocessor 102 programs the DMA controller 106 to handle the data transfer and, after programming the DMA controller 106, the microprocessor 102 can go about other tasks. After being programmed, the DMA controller 106 transfers the data in a somewhat autonomous fashion, and asserts an interrupt request (IRQ) to notify the microprocessor 102 that the data transfer is complete. In this way, the microprocessor 102 can off-load large data transfers to the DMA controller 106 and use its own resources for more suitable tasks. Hence, DMA controllers may be useful any time a microprocessor struggles to efficiently transfer data, where the microprocessor needs to perform useful work while waiting for a relatively slow I/O data transfer, or in other suitable instances.

While DMAs can improve the efficiency of data transfers for digital processing systems, DMAs also have the potential to wreak havoc on these systems if there are any bits in memory that have been corrupted and which the DMA acts upon.

DETAILED DESCRIPTION

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

As mentioned above, absent adequate safeguards, DMA controllers can wreak havoc in digital systems if they inadvertently act on corrupted data stored in memory. To remedy this issue and also limit the amount of resources spent by the microprocessor in managing the DMA, the present disclosure provides improved DMA integrity checking techniques. In these integrity checking techniques, a DMA controller can be programmed with a sequence of transaction control sets (e.g., which point to descriptors and/or links in memory) along with corresponding expected error detection coding information. When transferring data as specified by a first transaction control set, the DMA controller incrementally updates an actual error detection code with each and every move transaction included during execution of the first TCS. If the DMA is to autonomously continue after completion of the move sequence specified by the first TCS, a second TCS is needed, and it is at the point of loading the second TCS that the actual error detection code (which had been accumulated over previous transactions) is checked against an expected error detection code contained in the second TCS. So long as the actual error detection code is the same as the expected error detection code, the DMA controller can continue with processing of the second TCS transfer without flagging an interrupt and without needing management from the microprocessor 202. Hence, the DMA integrity checking techniques disclosed herein check that a previously executed TCS (e.g., first TCS) has left the DMA system in an expected state after execution of the previous TCS (so as to detect any faults during execution). By providing this improved integrity checking, the DMA controller is more reliable and can be trusted to operate more autonomously, thereby freeing up the microprocessor for other tasks.

It will be appreciated that "error detection code" as referred to herein can be used to detect a data error present in bits, words, or other sizes of data. Error detection codes can include, but are not limited to cyclic redundancy checks, parity bit(s), and hash values, among others. In some instances, an error detection code can be implemented as an error correction code, wherein the information in the error correction code not only detects whether an error is present but also helps to correct the error.

Figure 2:
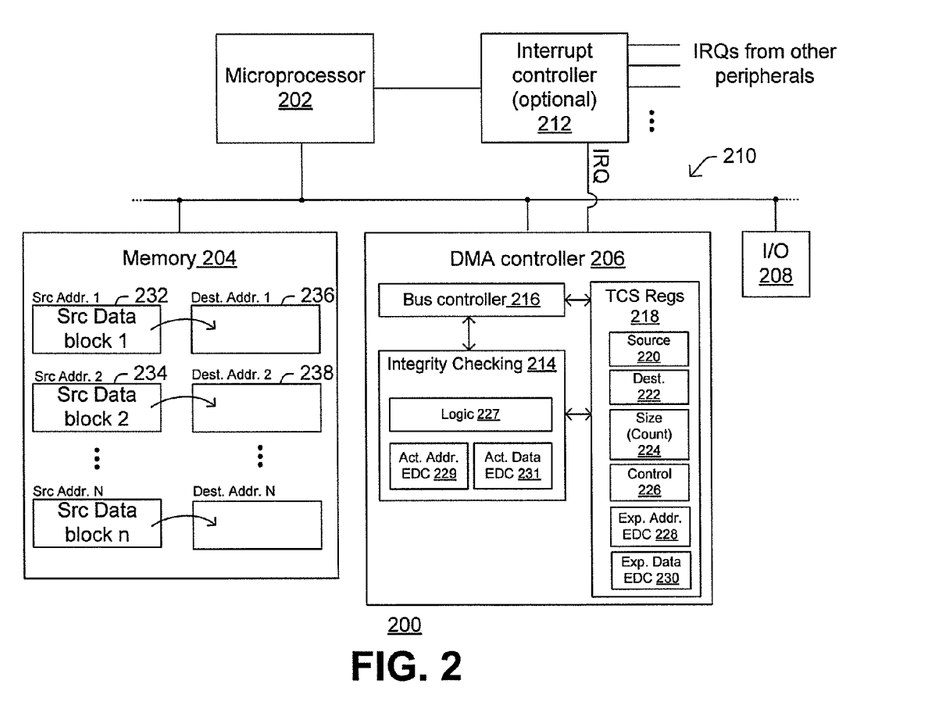
FIG. 2 shows a block diagram of digital system that makes use a DMA controller having an integrity checker in accordance with some embodiments.

FIG. 2 shows one example of a digital system 200 that makes use of a DMA controller in accordance with some embodiments. The system 200 includes a microprocessor 202, memory 204, DMA controller 206, and input/output module 208, all of which are operably coupled via a system bus 210. An interrupt controller 212, which receives interrupts from multiple respective peripherals and prioritizes them, may also be present in some implementations. Alternatively, the DMA may include its own trigger unit and arbiter, rather than using an interrupt as a trigger.

The DMA controller 206 includes an integrity checking module 214, bus controller 216, and transaction control set (TCS) registers 218. As will be appreciated in greater detail herein, a DMA operation can start when the microprocessor 202 load TCS registers 218 with a first transaction control set (TCS). This first TCS specifies a source address, destination address, size, and control information for one or more blocks of data to be transferred within memory 204.

After the TCS has been written to the TCS registers 218, the bus controller 216 then carries out the data transfer specified by the first TCS, for example, by transferring one or more source data blocks (e.g., src data block 232) to one or more corresponding destination address blocks (e.g., dest. data block 236). As each word is transferred in memory 204, the integrity checking module 214 calculates an actual error detection code. This actual error detection code can take the form of an actual address error detection code (stored in actual address EDC register 229), which is based on the memory addresses actually accessed by the DMA controller while executing the first transaction control set. The actual error detection code can also take the form of an actual data error detection code (stored in actual data EDC register 231), which is based on the data actually transferred by the DMA controller 206 while executing the first transaction control set.

After data of the first TCS has been transferred, logic 227 can then compare these actual error detection code(s) stored in 229/231 to corresponding expected error detection code(s) stored in 228/230, respectively. The expected error detection code(s) stored in 228/230 are often read from a second TCS by the DMA controller. For example, the second TCS can follow the first TCS in the sequence of transaction control sets. If the actual error detection code(s) stored in 229/231 is different from the expected error detection code(s) in 228/230, the DMA controller 206 halts data transfers and flags an error (e.g., an interrupt IRQ) to limit damage to data stored in memory 204. If no error is detected, the DMA continues with another data transfer specified by the next TCS in the sequence without flagging an interrupt so the microprocessor 202 can continue with other tasks un-interrupted. Thus, by comparing the actual and expected error codes and putting adequate safeguards in place, the DMA controller helps to ensure data has been moved accurately.

It will be appreciated that actual data error detection codes stored in 231 can be calculated independently of the actual src./dest. address error detection codes stored in 229. Thus, some implementations may employ only data error detection codes, while other implementations may employ only error detection codes calculated over source and/or destination addresses. Still other implementations can use both data error detection codes and error detection codes calculated over source and destination addresses.

In some applications, such as shown in FIG. 2 for example, source data is "scattered" over a number of non-contiguous blocks across physical memory 204. For example in FIG. 2, a first data block 232 having a first data size starts at a first base address (src addr 1), wherein consecutive bytes of the first data block are stored at consecutively incremented addresses from the first base address until all of the data is stored up to the first data size. A second data block 234 having a second data size can be stored starting at a second base address (src addr 2), which is non-contiguous with regards to the addresses of the first data block 232 in physical memory 204. Any number of other data blocks can also be stored in this fashion. Destination addresses, to which the source data blocks are to be moved or copied, can also be similarly scattered across physical memory 204. For example, in FIG. 2, first destination block 236 is where first source data block 232 is to be moved, and second destination block 238 is where second source data block 234 is to be moved.

With reference to FIG. 2, there is also a possibility to configure the DMA controller to skip addresses or even not modify the addresses in a source and/or destination block (232, 236). For example, the DMA can be set to read a single byte at a time from constant source address (such as a serial channel receive register) and write the data to a destination buffer on a 8 bit, 16 bit, 32 bit or 64 bit increment of the destination address. This way, the DMA can expand, contract, and/or interleave data in buffers as the DMA moves it around to make it more suitable for further processing (for instance for FFT filtering that needs specific data alignments).

An example of DMA controller functionality is now described in more detail with regards to FIGS. 3A-3D. Like the previously described systems, the system 300 in FIGS. 3A-3D includes a microprocessor 302, memory 304, and DMA controller 306, which are operably coupled by a system bus.

Figure 3A:
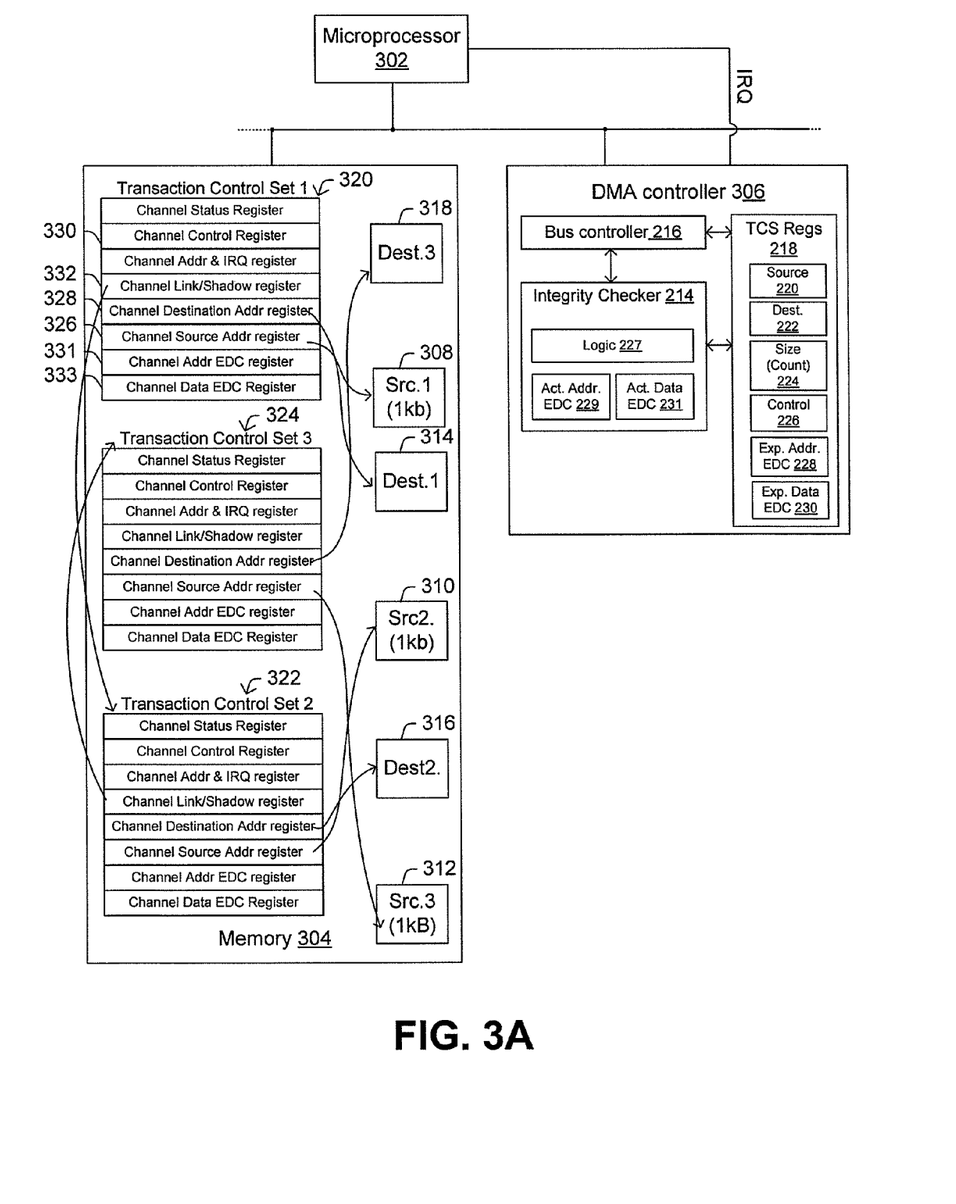
FIGS. 3A-3D collectively illustrates an example where a DMA controller in accordance with some embodiments performs a data transfer with integrity checking.

FIG. 3A provides an illustrative example where the processor 302 desires to transfer 3 kilobytes of source data, which is scattered across three non-contiguous memory blocks (308, 310, 312), to three non-contiguous destination blocks (314, 316, 318). Although this example transfers three blocks of non-contiguous source data, each of which is one kilobyte in size, to three equally sized destination addresses, it will be appreciated that any number of blocks of data and data block of any size can be used. The blocks can have the same size, or can be different sizes. Further, the source data and/or destination data can be arranged in a continuous block in some implementations, rather than being non-contiguous as illustrated.

To effectuate this desired data transfer, microprocessor 302 builds a linked list of link structures (320, 322, 324) in memory 304. The link structures 320, 322, 324 include DMA control information and pointers to the respective data blocks spread over memory. For example, link structure 1 (320) has a source address field 326 that points to base address of first source data block 308, and also has a destination address field 328 that points to base address of first destination block 314. Link structure 1 320 also includes a control field 330 that specifies the size of the source data block 308. The control field 330 also specifies link structure 1 is a link that is followed by another link (here link structure 2 322), while link field 332 provides a base address/pointer for this other link (here, base address of link structure 2 322). Because the linked structures in this example act as transaction control sets, the link structures, when viewed as a collective, can "gather" source data scattered across non-contiguous memory locations and/or can "scatter" data across non-contiguous destination addresses in one continuous DMA operation.

Figure 3B:
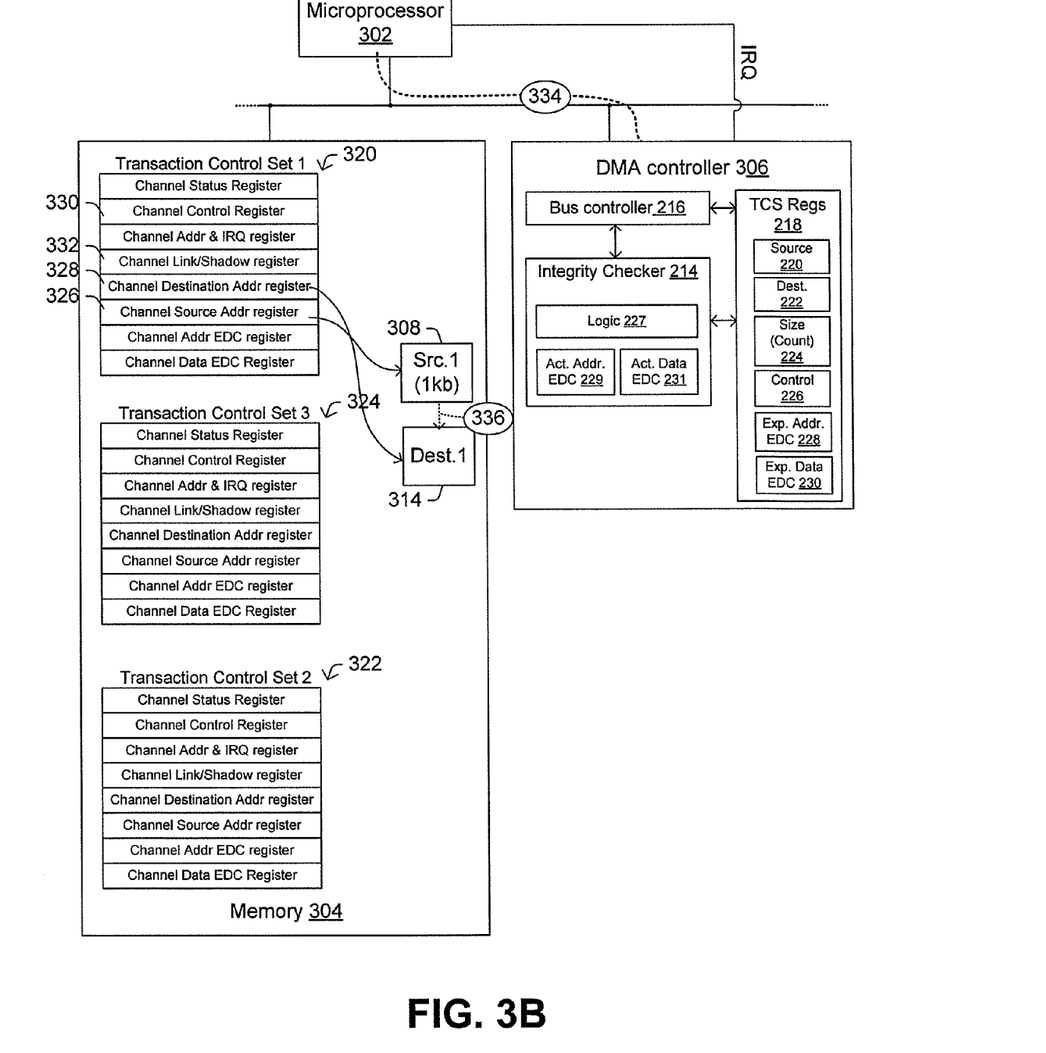

Referring to FIG. 3B, to effectuate the desired data transfer, the processor 302 writes the first transaction control set 320 to the TCS registers 218 in the DMA controller 306 (see line 334). In particular, the processor 302 writes a base address of the first data block 308 to source register 220, writes a destination address of a base address of the first destination block 314 to destination register 222, and writes a size of the first data block 308 to count register 224. The microprocessor also writes control bit(s) to control register 226 to indicate whether the TCS1 320 represents a link that is followed by another transaction control set.

The DMA controller, acting through its bus controller 216, then moves or copies first source data block 308 to first destination block 314 (see line 336). Typically, the DMA moves the data on a word by word basis, incrementing its count value 224 by one word and incrementing its source and destination address registers 220, 222 by one word as each word is transferred, until the specified data size has been transferred. The DMA can compute an actual address error detection code for the base source and base destination addresses, and stores this actual address EDC in actual address EDC register 229. The DMA can also compute an actual data EDC over the transferred data, for example by updating the actual data EDC 231 on a word by word basis, or by calculating the EDC code on larger chunks of the data.

Figure 3C:
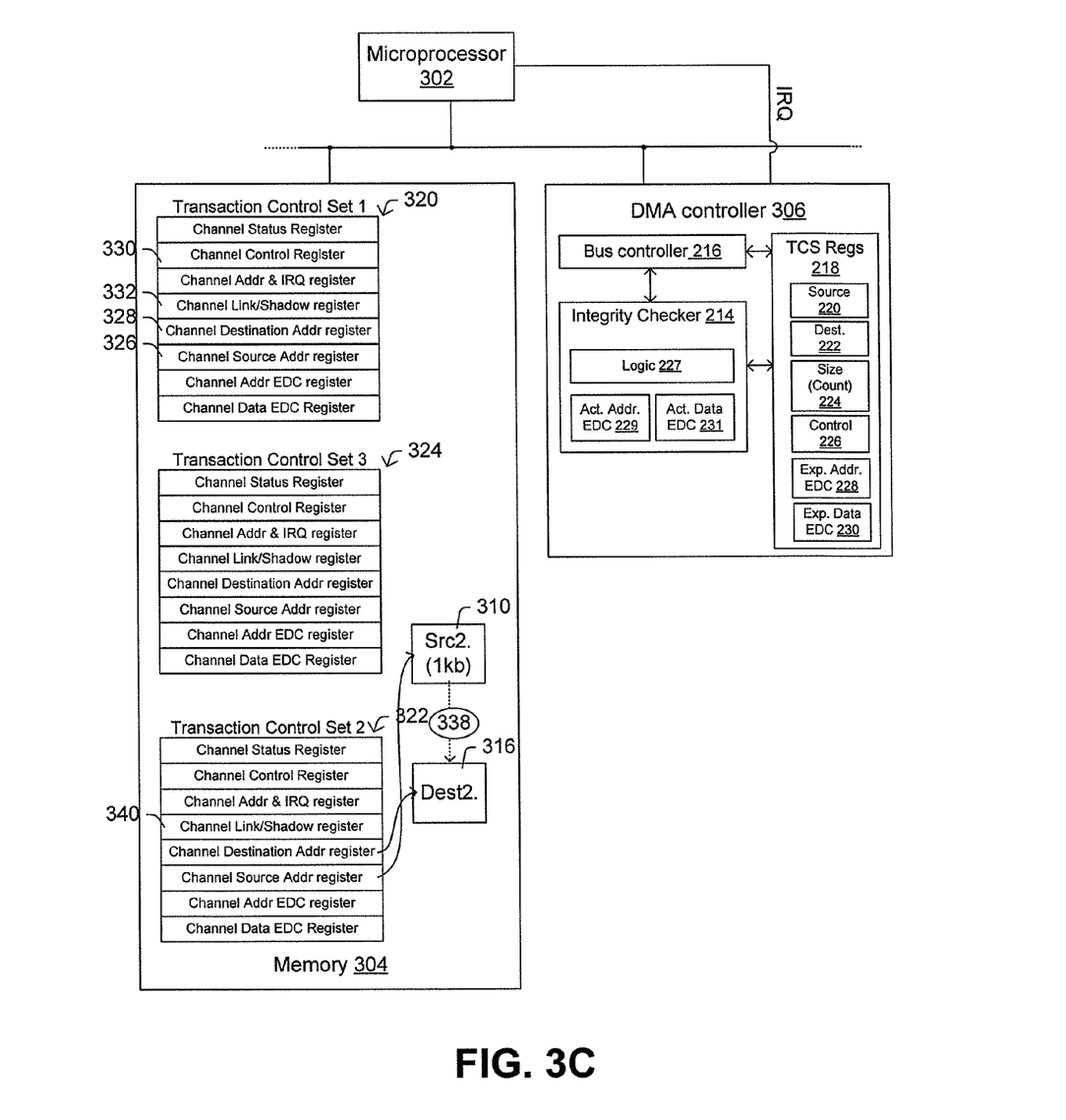

In FIG. 3C, the DMA grabs the second TCS2 link 322, whose base address was contained in link field 332 of TSC1 320, without requiring guidance from microprocessor 302. Because the second link structure 322 includes expected error checking codes pertaining to the first link structure 320, upon grabbing the second link structure 322, the DMA compares the expected error checking codes with the actual error checking codes stored in 229/231 (which were based on processing of the first link structure 320). If the DMA detects an error in EDCs, it can flag an interrupt, but otherwise can continue with the data transfer. Assuming no errors are detected, the logic 227 in DMA controller decodes the remaining fields in the TCS2 link 322, and based on these fields, transfers 1 Kb of data from the second source data block 310 to the second destination block 316 (see line 338). Logic 227 then updates the actual address EDC using Source/Destination Addresses in TCS2 322 and/or over transferred data for TCS2 322, and updates 229/231. This actual EDC is a "running total" with the actual EDC from TCS1 calculated in FIG. 3B, and thus the actual EDC values in 229/231 in FIG. 3C depend on addresses and/or data transferred in FIG. 3B.

Figure 3D:
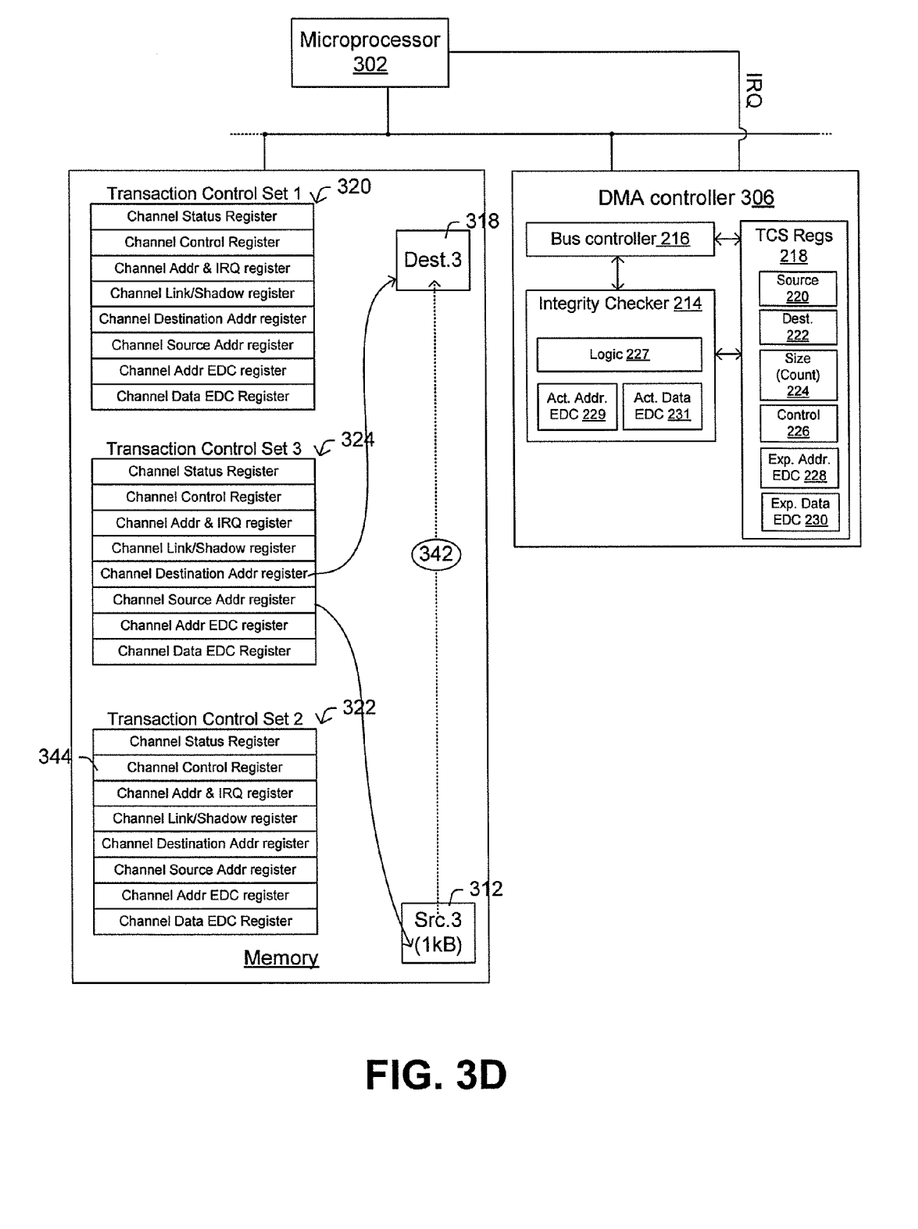

In FIG. 3D, the DMA grabs the third TCS3 link 324, whose base address was contained in link field 340 of TSC2 322, without requiring guidance from microprocessor 302. Because the third link structure 324 includes expected error checking codes pertaining to the second link structure 322, upon grabbing the third link structure 324, the DMA compares the expected error checking codes with the actual error checking codes stored in 229/231 (which were based on processing of the second link structure 322). Logic 227 decodes the fields in the TCS3 link 324, and based on these fields, transfers 1 Kb of data from Src.3 312 to Dest.3 318 (see line 342). Logic 227 then computes actual EDC for SRC/Destination Address in TCS3 322 and/or over transferred data for TCS3. This EDC is a "running total" with the EDC from TCS2 calculated in FIG. 3C (and EDC from TCS1 calculated in FIG. 3B for that matter). The control field 344 in TCS3 indicates TCS3 324 is the end of the chain of links, so DMA can set its status registers accordingly to be polled by the microprocessor at a suitable time. If errors are detected, the DMA can flag an interrupt. While a plurality of different embodiments has been described with reference to the figures, the present invention is not limited to these embodiments, as a plurality of modifications is possible without departing from the scope of the present invention. Some examples for such modifications will be described below. In some implementations, the data blocks are scattered over physical memory due to mapping between virtual memory addresses used by applications and physical memory addresses used by the operating system. Alternatively, the data blocks can be scattered over static, predetermined positions in memory (e.g., in flash or ROM used to store boot code). Further, although some embodiments described above are based on linked lists, the description is not limited in any way to linked lists. Other stack based or circular arrangements of TCS descriptors in memory are also possible.

Thus, it will be appreciated that some embodiments relate to a Direct Memory Access (DMA) controller. The DMA controller includes a set of transaction control registers to receive a transaction control set that describes a data transfer to be processed as a linked list by the DMA. A bus controller reads and writes to memory to accomplish the data transfer described in the transaction control set. An integrity checker determines an actual error detection code based on information in successive links of the linked list and selectively flags an error based on whether the actual error detection code is the same as an expected error detection code.

Another embodiment relates to a system. The system includes a memory to store a linked list data structure describing data to be transferred. A microcontroller is coupled to the memory via a bus structure, and is configured to access the linked list data structure and determine respective expected error detection codes for successive links in the linked list data structure. A direct memory access (DMA) controller actually transfers data in the memory according to the linked list data structure via the bus structure. The DMA controller includes an integrity checker to selectively flag an error based on whether the respective expected error detection codes are the same as actual error detection codes determined by the DMA when the DMA actually transfers the data according to the linked list data structure.

Still another embodiment relates to a method. In this method, a first transaction control set is stored in memory starting at a first base address. The first transaction control set includes a first source address of first source data to be transferred and a first destination address where the first source data is to be transferred. A second transaction control set, which is stored in memory starting at a second base address that is non-contiguous in memory with the first transaction control set, is also accessed. The second transaction control set includes a second source address of second source data to be transferred and a second destination address where the second source data is to be transferred. A first error detection code is determined based on the first transaction control set or the first source data. A second error detection code is determined based on the second transaction control set or the second source data. The second error detection depends on the first transaction control set or the first source data.

It is to be understood that in the description of embodiments contained herein any direct connection or coupling between functional blocks, devices, components, circuit elements or other physical or functional units shown in the drawings or described herein could also be implemented by an indirect connection or coupling, i.e., a connection or coupling comprising one or more intervening elements. Furthermore, it should be appreciated that functional blocks or units shown in the drawings may be implemented as separate circuits in some embodiments, but may also be fully or partially implemented in a common circuit or common integrated circuit in other embodiments, or in some cases may also be implemented jointly by programming a processor accordingly.

It should be noted that the drawings are provided to give an illustration of some aspects and features of embodiments of the present invention and are to be regarded as schematic only. In particular, the elements shown in the drawings are not necessarily to scale with each other, and the placement of various elements in the drawings is chosen to provide a clear understanding of the respective embodiment and is not to be construed as necessarily being a representation of the actual relative location of the various components and elements shown. The features of the various embodiments described herein may be combined with each other. On the other hand, describing an embodiment with a plurality of features is not to be construed as indicating that all those features are necessary for practicing the present invention, as other embodiments may comprise less features and/or alternative features.

What is claimed is:

1. A Direct Memory Access (DMA) controller, comprising:
    a set of transaction control registers configured to receive a sequence of descriptors that collectively describe a data transfer to be processed by the DMA controller;
    a bus controller configured to read and write to memory while the DMA controller executes a first descriptor to accomplish part of the data transfer described in the sequence of descriptors; and
    an integrity checker configured to determine an actual error detection code based on data which is pointed to by the first descriptor and which is actually transferred by the DMA controller during execution of the first descriptor, and further configured to selectively flag an error based on whether the actual error detection code is the same as an expected error detection code contained in a second descriptor of the sequence of descriptors.

2. The DMA controller of claim 1, wherein the first descriptor points to a linked list stored in memory.

3. The DMA controller of claim 2, wherein the linked list comprises:
a first link structure stored starting at a first base address in memory, the first link structure including: a first source address of first source data to be transferred, a first destination address where the first source data is to be transferred, and a link address pointing to a second link structure; and
the second link structure stored starting at a second base address in memory, the second link structure including: a second source address of second source data to be transferred, and a second destination address where the second source data is to be transferred.

4. The DMA controller of claim 1, wherein the actual error detection code is an actual data error detection code that is based on one or more data values transferred during execution of the first descriptor.

5. The DMA controller of claim 1, wherein the actual error detection code is an actual address error detection code that is based on at least one of: a source address specified in the first descriptor from which the DMA controller read data, or a destination address specified in the first descriptor to which the DMA controller wrote data.

6. The DMA controller of claim 5, wherein the integrity checker further comprises:
a mechanism to provide an expected address error detection code, where the expected address error detection code is based on a set of addresses that are expected to be accessed by the DMA controller during the data transfer.

7. The DMA controller of claim 6, wherein the DMA controller is configured to determine whether the expected address error detection code matches the actual address error detection code.

8. The DMA controller of claim 7, wherein the integrity checker is further configured to selectively delay or halt the second descriptor based on whether the expected address error detection code matches the accessed address error detection code for the first descriptor.

9. The DMA controller of claim 1, wherein the integrity checker comprises:
a mechanism to provide an expected data error detection code, where the expected data error detection code is based on the data that is expected to be transferred during the data transfer; and
logic to calculate an accessed data error detection code based on data in the data transfer actually transferred by the DMA controller.

10. The DMA controller of claim 1, wherein the integrity checker updates the actual error detection code on a word-by-word basis for data transferred during execution of the first descriptor.

11. The DMA controller of claim 1, further comprising:
an actual data error detection code register to store the actual error detection code; and
an actual address error detection code register to store an actual address error detection code, wherein the DMA controller calculates the actual address error detection code based on a base source address and a base destination address of the first descriptor.

12. The DMA controller of claim 11, wherein the actual address error detection code is updated during execution of multiple descriptors to reflect a running total of multiple base source addresses and multiple base destination addresses in the respective multiple descriptors.

13. A system, comprising:
a memory configured to store a sequence of descriptors describing data to be transferred;
a microcontroller coupled to the memory via a bus structure, the microcontroller configured to access the sequence of descriptors and determine respective expected error detection codes for successive descriptors in the sequence; and
a direct memory access (DMA) controller to actually transfer data in the memory according to the sequence of descriptors via the bus structure, the DMA controller including an integrity checker to determine actual error detection codes based on data which is pointed to by respective descriptors and which is actually transferred by the DMA controller during execution of the respective descriptors, and further configured to selectively flag an error based on whether the respective expected error detection codes are the same as the actual error detection codes determined by the DMA when the DMA actually transfers the data according to the sequence of descriptors.

14. The system of claim 13, wherein the DMA controller is configured to, upon completing a successful data transfer as specified by the sequence of descriptors, await subsequent instructions corresponding to another data transfer without asserting an interrupt.

15. The system of claim 13, wherein the DMA controller is configured to assert an interrupt if the error is flagged.

16. The system of claim 13, wherein the sequence of descriptors comprises a linked list data structure comprising:
a first link stored starting at a first base address in memory, the first link including a first source address of first source data to be transferred and a first destination address where the first source data is to be transferred; and
a second link stored starting at a second base address in memory, the second link including a second source address of second source data to be transferred and a second destination address where the second source data is to be transferred.

17. The system of claim 16, wherein the integrity checker is configured to determine a first error detection code based on a first pointer in the first link and is configured to determine a second error detection code based on a second pointer in the second link.

18. The system of claim 17, wherein the second error detection code depends on the first pointer.

19. The system of claim 13, wherein the DMA controller selectively halts data transfer based on whether the actual error detection codes are the same as the expected error detection codes, respectively.

20. The system of claim 19, wherein the DMA controller upon completing the data transfer, sets a status register without flagging an interrupt so long as the actual error detection codes are the same as the expected error detection codes.

21. The system of claim 19, wherein the DMA controller selectively flags an interrupt if the actual error detection codes are different from the expected error detection codes.

22. The system of claim 13, further comprising:
an actual data error detection code register to store an actual error detection code; and
an actual address error detection code register to store an actual address error detection code, wherein the DMA controller calculates the actual address error detection code based on a base source address and a base destination address of a first descriptor.

23. A method, comprising:

accessing a first descriptor stored in memory starting at a first base address, the first descriptor including a first source address of first source data to be transferred and a first destination address where the first source data is to be transferred;

accessing a second descriptor stored in memory starting at a second base address that is non-contiguous in memory with the first descriptor, the second descriptor including a second source address of second source data to be transferred and a second destination address where the second source data is to be transferred;

determining a first actual error detection code based on the first descriptor; and determining a second actual error detection code based on the second descriptor, wherein a calculated value of the second actual error detection code depends on the first descriptor.

24. The method of claim 23, further comprising:

selectively flagging an interrupt if the first or second actual error detection codes are different from first or second expected error detection codes, respectively.

* * * * *